Dec. 19, 1944.      L. C. FLOWERS      2,365,539
ELECTROLYTIC ETCHING POLISHED SURFACE
Filed May 7, 1941
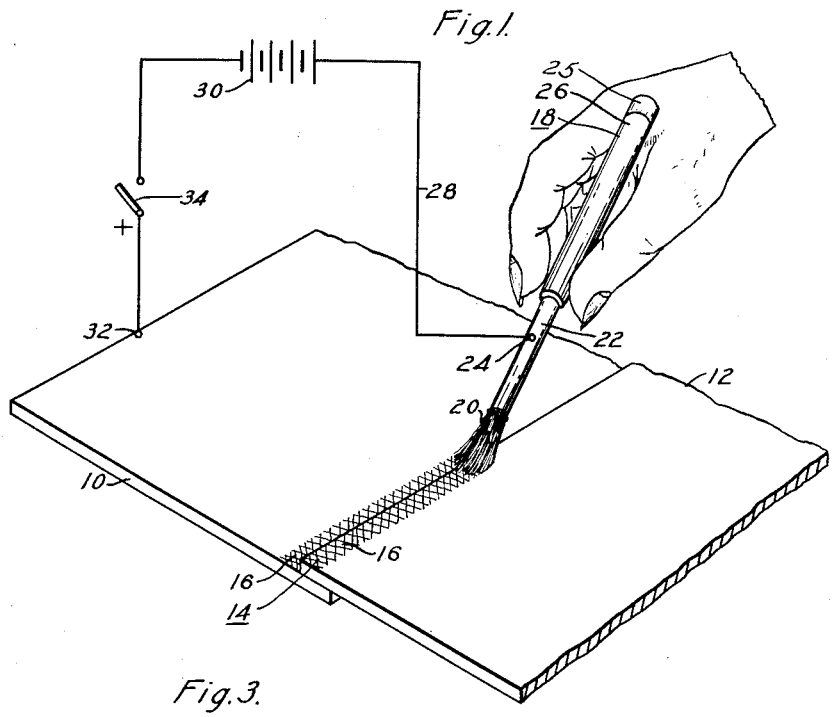
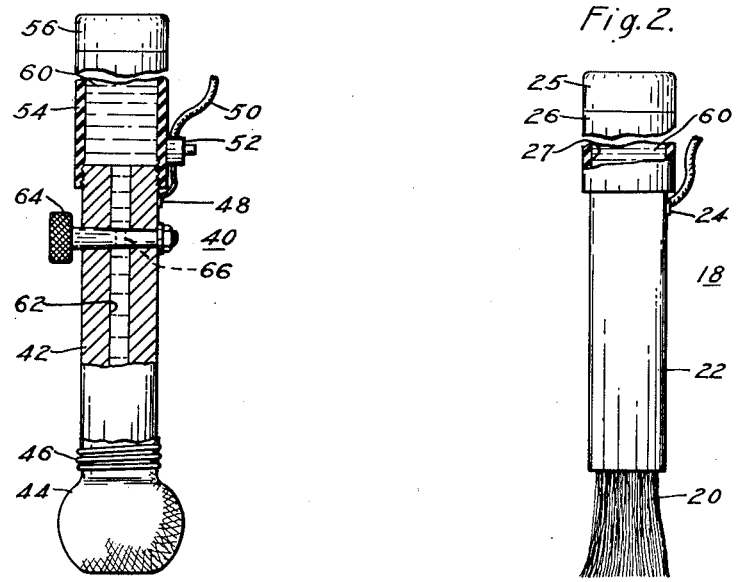
WITNESSES:
INVENTOR
Leonard C. Flowers.
BY
ATTORNEY Patented Dec. 19, 1944

2,365,539

UNITED STATES PATENT OFFICE 2,365,539

ELECTROLYTIC ETCHING POLISHED SURFACES

Leonard C. Flowers, Springfield, Mass., assignor to Westinghouse Electric & Manufacturing Company, East Pittsburgh, Pa., a corporation of Pennsylvania Application May 7, 1941, Serial No. 392,325

2 Claims. (Cl. 204—143)

This invention relates to the joining of stainless metals, particularly by the application of soft solder thereto.

Heretofore, the use of soft solder in effecting joints between stainless metals of the type of stainless steel, and other corrosion resisting alloys, has been attended with considerable difficulty. Due to the nature of the metals themselves, soldering fluxes which are effective with base or corrodible metals have little effect on the stainless metals. Consequently, the employment of the strongest etching fluxes, such as muriatic acid or phosphoric acid, has been necessitated in order to make soft solder adhere operatively to these metals.

The use of highly corrosive fluxes is attended by an increase in the danger of injury to the operator. In addition there has been a considerable amount of spoilage from spattering, running and the like of the flux on the sheets of material during a soldering operation. The use of soft solder with the stainless metals has accordingly been quite limited and more expensive methods of joining these materials has been substituted.

The object of the invention is to provide for applying a non-corrosive flux to stainless metals in a manner to enable the effective application of soft solder.

A further object of the invention is to provide an electrical device for rendering non-corrosive fluxes usable for the application of solder.

Other objects of the invention will in part be obvious and will in part appear hereinafter in the specification and claims.

For a fuller understanding of the nature and object of the invention, reference should be had to the following detailed description taken in connection with the accompanying drawing, in which:

Figure 1 is a perspective view of the method of employing non-corrosive fluxes.

Fig. 2 is an elevational view partly in section of a soldering implement of the type shown in Fig. 1, and Fig. 3 is an elevational view partly in section of a modified form of flux applying implement.

The corrosion resistant metals, such as chromium-iron or nickel-chromium-iron alloys and the like, have been particularly resistant to the effective application of the common non-corrosive fluxes. These common non-corrosive fluxes, such for example, as zinc chloride, ammonium chloride, aniline phosphate which have been used with the easily attacked base metals have been resisted by the passive surface of the stainless metals. The surface of the stainless metals not only resists etching by the flux but in some cases cannot even be wetted thereby. Accordingly, subsequent soldering metal will not adhere to the stainless metal and successful soldering is not possible.

If soldering is attempted with any of these non-corrosive fluxes, it is necessary to introduce large quantities of strong acids such as muriatic acid or phosphoric acid in order to break down the passive film on this stainless metal and produce sufficient etching whereby the flux will wet the surface and thus permit effective soldering. The use of these strong acids is a practice which it is desirable to avoid due to the hazard encountered in their use in manufacturing establishments. Furthermore, when the strong acid fluxes are applied for soldering, the spattering and running of this material over any other portion of the stainless metal will result in the reduction of the passivity of the surface and consequent enhanced corrosion of the spattered area when in use. In the case of the highly finished surfaces, the acid flux causes streaking and spotting of the surface with a considerable amount of scrap due to surface blemishes. If the flux remains within the joint, corrosion may keep on until the metal has been deeply corroded and may be rendered useless for the purpose intended. For these various reasons, soldering of the stainless metals such as stainless steel and the like has not been prevalent in the commercial field.

There are numerous articles fabricated at the present time from stainless metals, particularly in the thinner gauges which are not subjected to extreme temperatures or conditions of high stress for which soft soldering would be an economical fabrication expedient. Decorative fixtures, household appliances and numerous other members which employ these stainless metals could be fabricated by the use of soft soldering in place of the more expensive welding and riveting operations which are usually employed at the present time for these articles.

By means of this invention, substantially non-corrosive fluxes which will conduct electrical current may be safely employed in a manner to enable the effective application of solders without increasing the hazards or involving the scrapping of material usually encountered in the use of acid fluxes.

Referring to Fig. 1 of the drawing, there is shown an apparatus by means of which non-corrosive fluxes may be applied to predetermined areas of stainless metals in a manner to etch the stainless metal and render soft soldering effective. The stainless metal plates 10 and 12, composed, for example, of iron with a high chromium and nickel content, as shown in the figure, are to be soldered at the joint 14. The flux is applied to the areas 16—16 upon which the molten solder is to be subsequently applied for the production of a satisfactory joint. The flux which is electrically conducting is treated by means of an electrical current through the medium of a manual implement 18. The implement 18 consists of a brush 20 carrying sufficient of the flux in solution whereby an electrical current will pass therethrough. A conducting holder 22 of metal, for example, is attached and in circuit with the brush 20. A conductor is fastened at 24 to the holder 22. A manually engageable handle 26 is fixed to the holder 22 at the end opposite from brush 20.

Electrical current flows along the conductor 28 to the connection 24 from the cathode of a battery 30 or other conventional source of electrical current. Ordinarily, the source of current 30 will supply electrical current at an electrical pressure of four to six volts. The voltage may vary from these values depending on conditions. The anode of the electrical source 30 is connected to the stainless metal plate 10 at 32 by means of a spring clip or other easily attachable member, as is well known in the art. A switch 34 may be put within the circuit to provide for making and breaking of the electrical current flow. The anode of the source of current may be connected to plate 12 as well in case the contact between the plate 10 and plate 12 is not sufficient to permit good current flow between the two members. The brush 20 may be dipped into a supply of a non-corrosive, electrically conducting flux, zinc chloride for example, and applied to the plate while connected to the source of current 30.

Upon contact with the anode plates 10—12, the electrical current will cause a reaction to occur between the passive metal surfaces and the flux which acts as an electrolyte. The iron will be affected by the electrical current to cause the formation of both ferric and ferrous ions, thus etching the surface of the stainless metal. The zinc chloride electrolyte will produce hydrogen gas or effect an equivalent electrochemical reaction. The effect on the electrolyte is believed not to be critical. The passive film on the stainless metal immediately below the brush in its passage thereover will be removed and the underlying metal will thereby be made active. The stainless metal will thus be etched and its resistance to the flux and bonding to solder will be decreased. The flux will wet the predetermined areas over which the electrical current has thus reacted. The treated areas now provide a base for subsequent effective soldering.

Subsequently, the application of molten tin, lead, solder and the like to the predetermined etched areas at the joint 14 will result in a flow of the solder over the area 16 with a good bond being produced. This soldering has resulted in highly acceptable joints upon the stainless metals.

While Fig. 1 shows a lap joint, the joint between the stainless metals may be of any other configuration upon which the brush electrode may be passed to cause reaction thereat.

The solution of the substantially non-corrosive flux need not be applied to the brush by frequent dipping into an external container. As shown in Fig. 2 of the drawing, a reservoir connected with the manual implement 18 may be employed to provide for continuous application of the flux to the joint. The implement 18, as shown in Fig. 2, has a hollow 27 within the manual engageable portion 26 containing a quantity of a liquid electrolytic flux 60 of a substantially non-corrosive nature. A cap 25, closing the cavity 27 and with provision therein for admitting air as the electrolyte 60 flows out, provides for the introduction of the electrolyte flux. The brushholder 22 has an elongated hole therein permitting desired amounts of the electrolyte to escape to the brush. Any convenient provision may be made for preventing leakage of the flux when the implement 18 is not in use. For example, the air inlet may be closed or a valve inserted to control the flow of electrolyte in the holder 22.

Referring to Fig. 3, there is shown a modified type of electrolyte flux applicator 40 usable as shown in Fig. 1. The applicator 40 consists of a holder 42 of some electrically conducting material. Attached to the lower end of the holder 42 is a swab 44 of porous fabric or even of a metallic mesh which is held thereto by means of wire 46. Electrical current enters the holder 42 at the connection 48 from conductor 50. In circuit with the conductor 50 is a circuit interrupter 52 adapted to be engaged by the hand of the operator employing the applicator 40. Upon release of the applicator 40, the interrupter 52 will function to break the circuit and prevent wastage of electrical current. Attached to the end of the holder 42 opposite from that at which the swab 44 is attached is a hollow cylindrical shell 54 which is manually engageable during the use of the applicator. A removable cap 56 permits the introduction of additional electrolyte flux 60 into the hollow interior 54. A central aperture 62 extends from the upper shell 54 to the swab 44 and permits flow of the electrolyte flux 60 to the swab. A rotatable valve 64 having an alignable passage 66 provides a means for controlling the flow of electrolyte flux from shell 54 to the swab 44.

Other means than the brush 20 or the swab 44 may be employed for distributing the liquid flux or electrolyte to the stainless metal during the electrolysis thereof. These constitute two distributor means for achieving this function. The main requirement for the distributor means is that current be conducted through along with a relatively uniform distribution of the flux.

An excess of the electrolytic flux may be placed upon the stainless metal. No damage to the surface of the stainless metal either as respects the finish or subsequent corrodibility will occur if the flux runs and spatters during soldering or subsequent operations. The substantially non-corrosive flux will have no action upon the metal surface except at the predetermined areas where electrical surrent has flowed and caused the metal to dissolve and etch. The flux is safe to employ as far as the personnel is concerned and is a considerable advantage over the prior art use of the highly corrosive acid materials.

While the figures of the drawing have illustrated manual devices for applying electrical current through the flux, automatic apparatus employing some similarly functioning members is also entirely feasible. For example, the plates 10 and 12 may be passed below a pivotally suspended implement of the type shown at 18 in Fig. 1 with automatic means for turning the current on and off and applying the flux.

In any case, the application of the flux and the application of electrical current is attended with little difficulty. The whole operation is exceedingly economical. The etched and fluxed joint is rapidly produced. Solder may be applied as soon as desired after the electrolysis of the flux has taken place.

While this invention has been described as being of particular utility with stainless metals, the base metals may likewise be soldered by the use of an electrically conducting flux which is subjected to electrical current to cause etching of the metal. Highly corrosive acids and the like may be dispensed with by this method with a decrease in hazard. The fluxed joint will be satisfactory for soldering.

Since certain changes in carrying out the above processes and certain modifications in the implement which embody the invention may be made without departing from its scope, it is intended that all the matter contained in the above description or shown in the accompanying drawing shall be interpreted as illustrative and not in a limiting sense. Therefore, it is desired that the invention be interpreted as broadly as possible and that it be limited only by what is set forth in the following claims.

I claim as my invention:

1. In the method of etching polished surfaces of stainless steel and stainless iron by the application of a relatively noncorrosive flux to avoid etching and blemishing of the polished surfaces except at predetermined areas, the steps of applying to the metal an electrically conducting aqueous solution of a flux substantially noncorrosive to the stainless steel and stainless iron, the flux selected from the class consisting of zinc chloride, ammonium chloride and aniline phosphate, disposing a movable electrode closely adjacent to the metal and in contact with the aqueous solution, passing an electrical current from the electrode to the metal through the aqueous solution, with the metal being the anode, and moving the electrode over the predetermined areas to be etched while the current is flowing, the passage of the electrical current rendering the flux solution between the electrode and metal temporarily corrosive to the metal to effect etching, the flux solution after electrical current ceases to flow therethrough becoming relatively noncorrosive to the metal.

2. In the method of etching for soldering purposes stainless steel and stainless iron and by the application of a flux substantially noncorrosive thereto, the steps comprising applying to the metal a layer of a substantially noncorrosive, electrically conducting aqueous solution of the flux selected from the class consisting of zinc chloride, ammonium chloride and aniline phosphate at the areas to be etched and soldered, disposing a movable electrode closely adjacent to the metal at the areas to be soldered and in contact with the applied layer of flux, passing an electrical current from the electrode to the metal, with the metal being the anode, and moving the electrode over the areas of the metal to be etched while the current is flowing, the passage of electrical current rendering the flux solution between the electrode and metal temporarily corrosive to the metal to effect etching, the flux solution after electrical current ceases to flow therethrough remaining substantially noncorrosive to the metal.

LEONARD C. FLOWERS.